United States Patent [19]

Hill et al.

[11] Patent Number: 4,493,601
[45] Date of Patent: Jan. 15, 1985

[54] HIGH CAPACITY, SELF-UNLOADING FORAGE HOPPER

[75] Inventors: Amos G. Hill, Hesston; Arlen J. Wiens, North Newton, both of Kans.

[73] Assignee: Hesston Corporation, Hesston, Kans.

[21] Appl. No.: 354,938

[22] Filed: Mar. 5, 1982

[51] Int. Cl.³ .................. B60P 1/04; A01D 90/00
[52] U.S. Cl. ....................... 414/491; 414/523; 296/26; 220/1.5
[58] Field of Search ............... 414/398, 467, 469–471, 414/473, 491, 505, 523, 528, 919; 298/18, 23 C, 7, 23 D, 23 R, 23 TT; 296/10, 26, 100, 101, 165, 172, 176, 27; 220/1.5, 4 A, 6, 8; 198/550, 557, 560; 56/16.4, 16.6, 28

[56] References Cited

U.S. PATENT DOCUMENTS

| | | | |
|---|---|---|---|
| 2,862,342 | 12/1958 | Fergason | 298/18 X |
| 3,844,604 | 10/1974 | Kasten | 296/26 |
| 3,894,646 | 7/1975 | Head et al. | 414/505 |
| 3,968,634 | 7/1976 | Anderson et al. | 56/16.6 X |
| 4,068,891 | 1/1978 | Herbst | 298/7 |
| 4,095,838 | 6/1978 | Beeler | 296/26 |

FOREIGN PATENT DOCUMENTS 190697 2/1967 U.S.S.R. .................. 56/28

OTHER PUBLICATIONS

D'Hooghe harvester sales literature, undated.

Primary Examiner—Joseph E. Valenza
Assistant Examiner—David A. Bucci
Attorney, Agent, or Firm—Schmidt, Johnson, Hovey & Williams

[57] ABSTRACT

The forage receiving container box of a crop transporting vehicle has a shiftable top that may be closed down to compact the box for over-the-road travel without exceeding applicable roading height and width restrictions and may be projected up when the box is prepared for field operations whereby to expand the holding capacity of the box. When the box is rotated from its over-the-road position to its field-operating position, an unloading spout may be swung down from one lateral side of the box to come into alignment with the upwardly and outwardly inclined floor of the box whereby a conveyor extending along the floor and the spout may be utilized to unload the box on-the-go into a truck or trailer pulled alongside the moving box. Projecting up the top of the box or closing it down is coordinated with moving the box between its field-operating and over-the-road positions, particularly with respect to swinging of the unloading spout between its stowed and operating positions.

6 Claims, 8 Drawing Figures

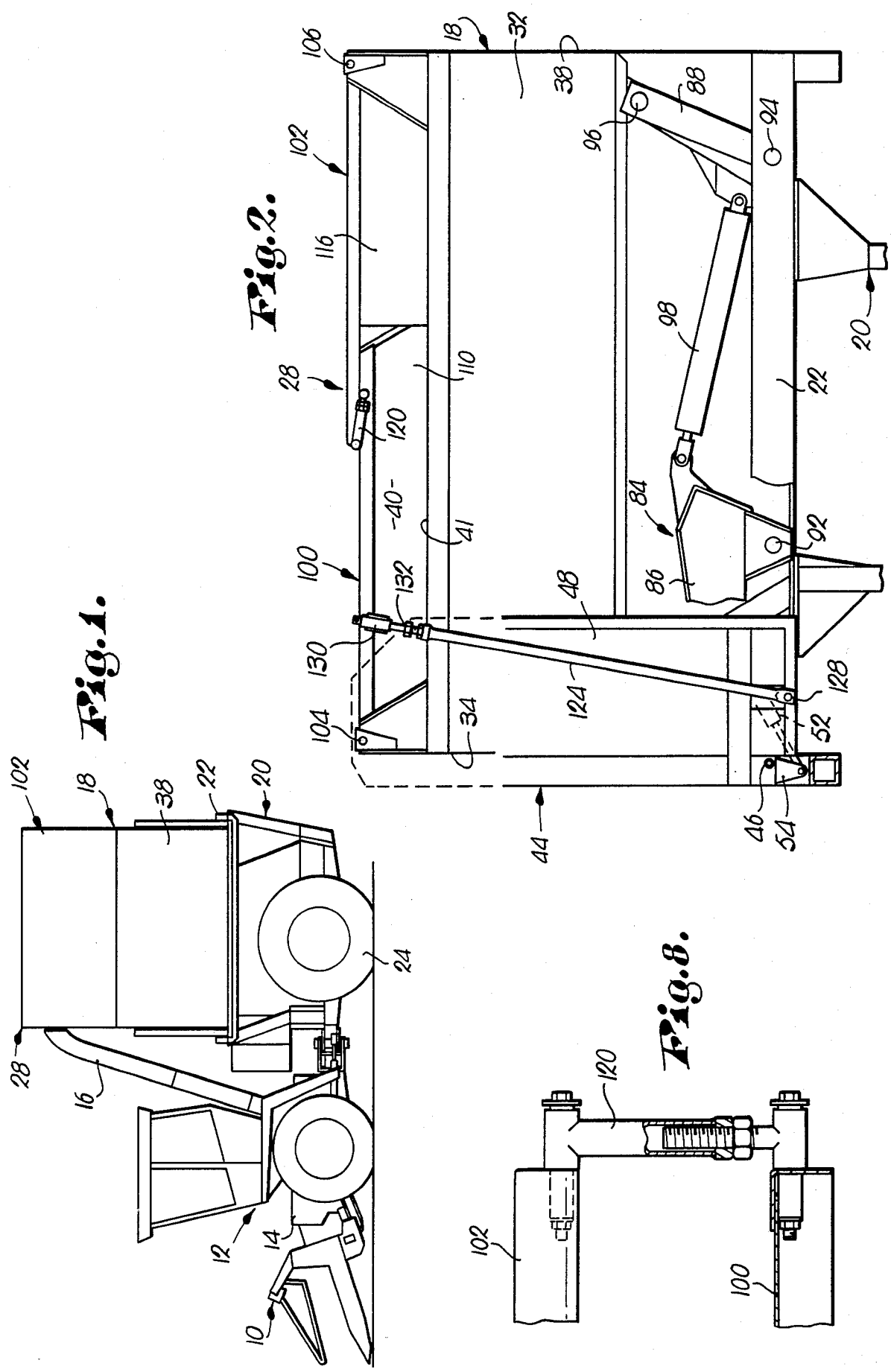

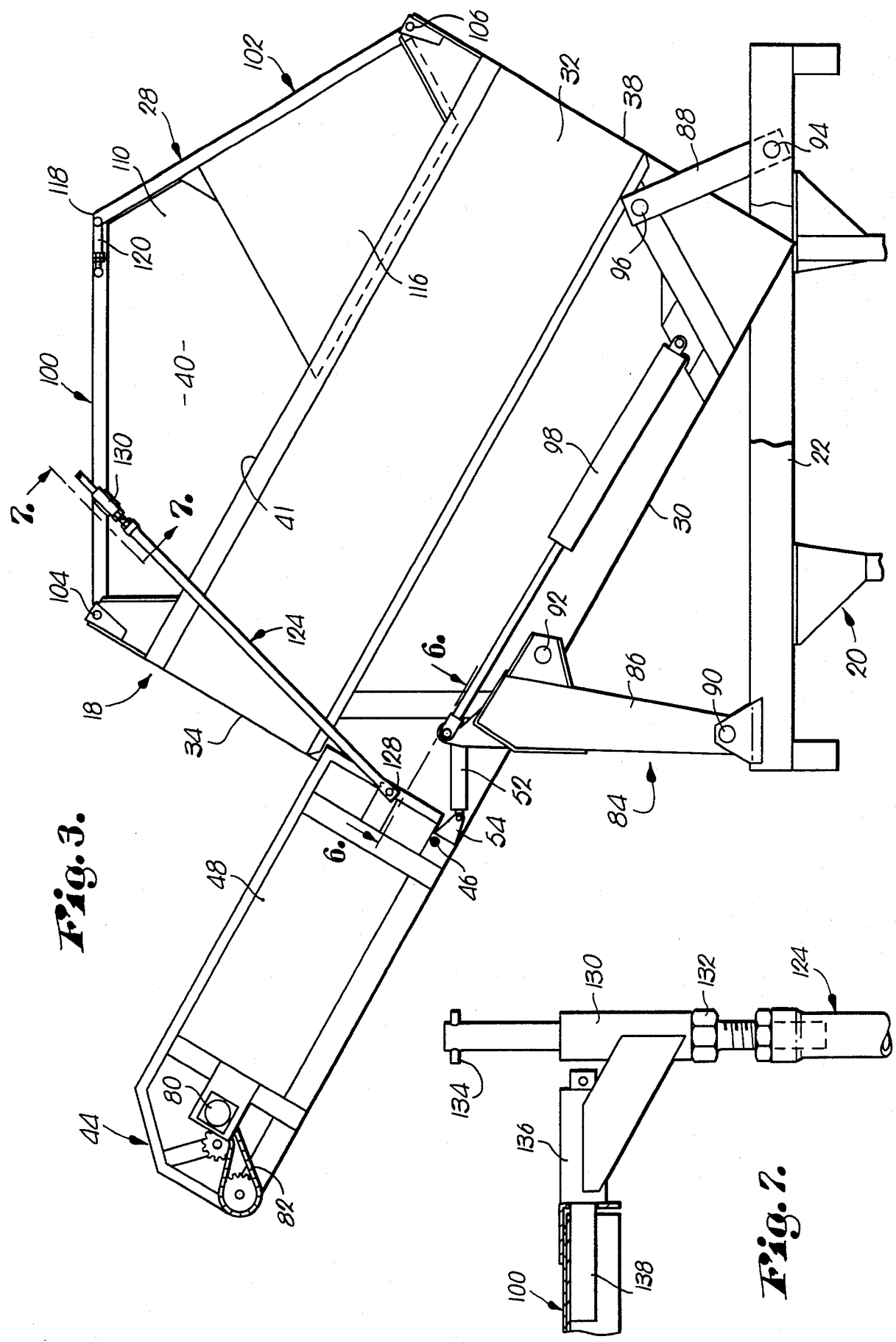

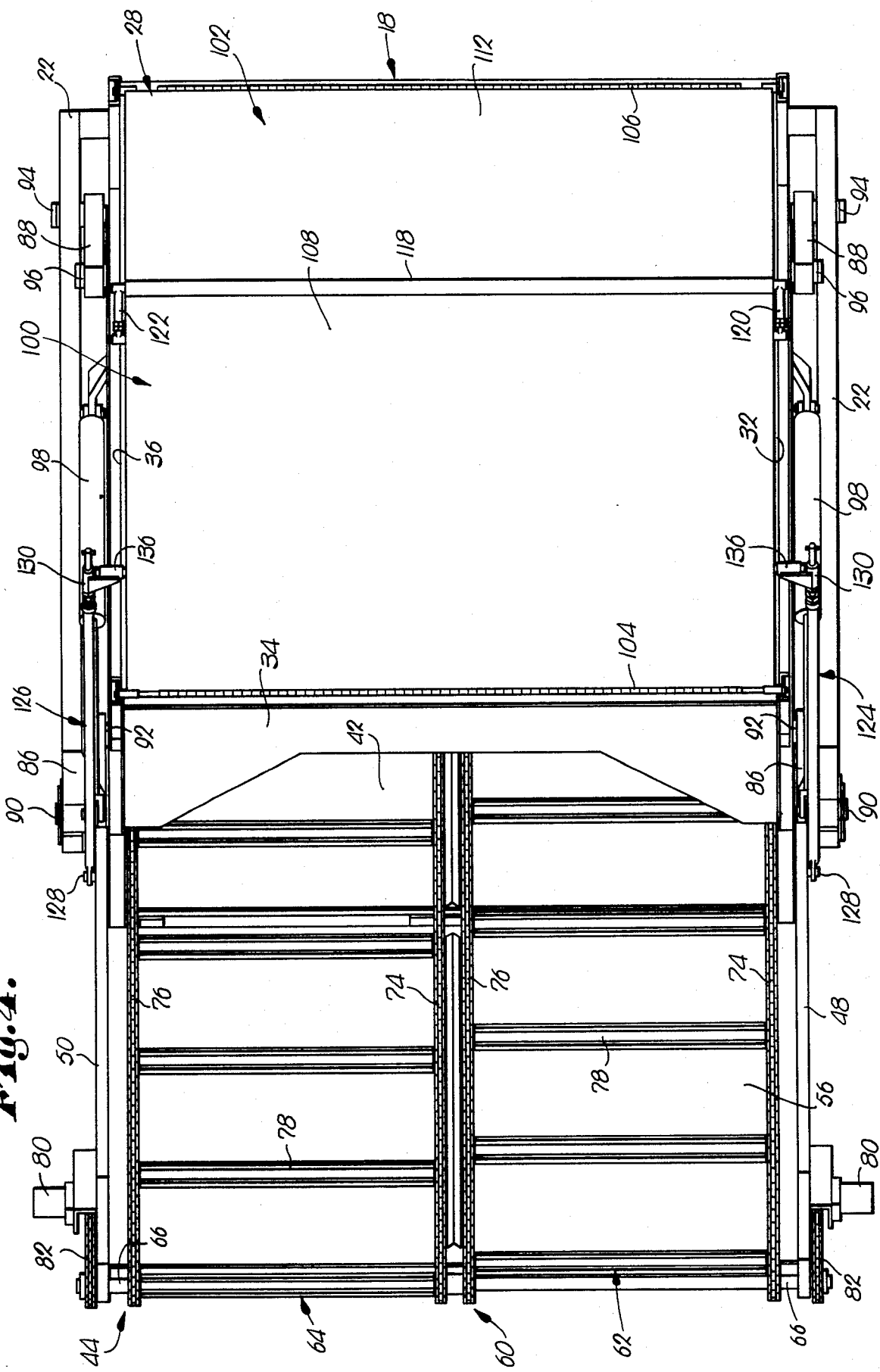

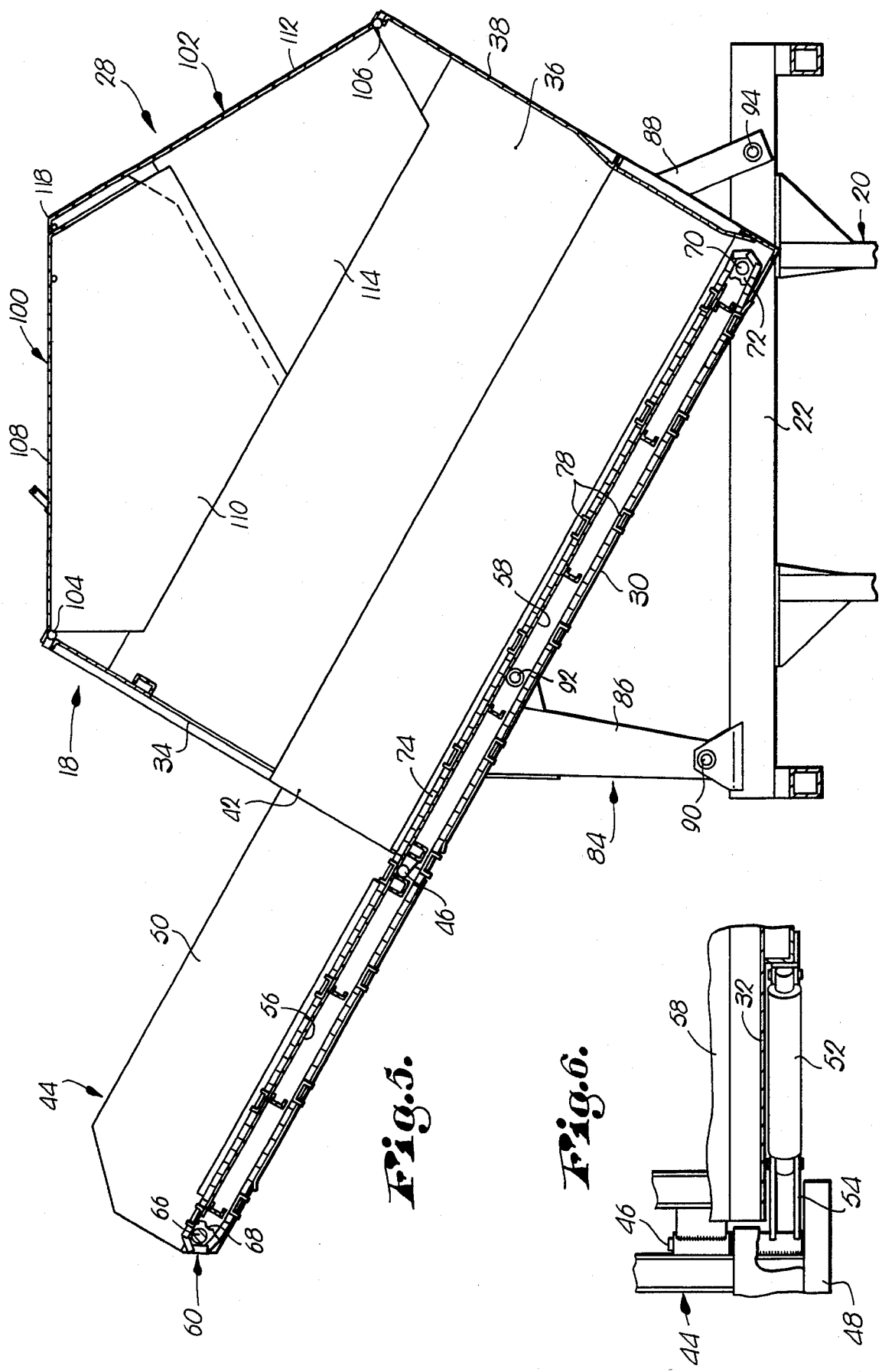

HIGH CAPACITY, SELF-UNLOADING FORAGE HOPPER

TECHNICAL FIELD

This invention relates to the field of transporting and handling harvested crop materials, and, more particularly, to a self-unloading transporting box for forage materials and the like having a special top which is designed to project up and thereby increase the carrying capacity of the box when the latter is adjusted from a compacted, over-the-road travel condition to a more expanded, field-operating condition.

BACKGROUND ART

During the harvesting of forage material it is common practice to drive a truck or wagon alongside of the harvester for the purpose of periodically filling the truck with materials that have been accumulated by the harvester during the truck's absence to discharge its load. Desirably, the harvesting process is carried out continuously, but, it is not at all uncommon for the harvester to temporarily stop further operations while awaiting the return of an empty truck or trailer in view of the limited holding capacity of the harvester. In this respect, governmental height and width restrictions with respect to vehicles which at least periodically utilize public roads place constraints on the holding capacity of container boxes used by such harvesters, and, moreover, the shapes and dimensions of the boxes have effects upon their loading and unloading characteristics. In this regard, inclined or converging side boxes normally fill more completely and evenly than upright sided boxes, for example, and the point of discharge from the boxes must be sufficiently elevated to safely clear the truck or trailer into which the contents are unloaded.

SUMMARY OF THE PRESENT INVENTION

Accordingly, one important object of the present invention is to provide a self-unloading, crop transporting box or container having the capability of being expanded from a compacted condition for over-the-road travel to a higher capacity condition for field operations that include loading, collecting, and unloading of harvested materials, thereby permitting continuous, on-the-go harvesting operations. Pursuant to the foregoing, the present invention contemplates having a shiftable top on the container box which is down in a space-saving position during over-the-road transport, but is projected up into a higher capacity position during field operations. A linkage between the top and a spout of the box which swings down into an operating position when the box is readied for field operation functions to responsively project up the top when the spout is thus readied for use. A front entry opening of the box for receiving materials blown into the latter by the blower spout of the harvester comes into position for use when the top of the box is projected upwardly.

BRIEF DESCRIPTION OF THE DRAWINGS

FIG. 1 is a schematic side elevational view of forage harvesting equipment employing an expandable container box construction according to the principles of the present invention;

FIG. 2 is a front elevational view thereof on an enlarged scale with the cab portion of the harvester removed and illustrating the box in its compacted, squared up position for over-the-road travel;

FIG. 3 is a front elevational view of the box similar to FIG. 2 but with the box rotated into its field operating position with the top projected upwardly and the unloading spout in position for operation;

FIG. 4 is a top plan view of the box when in its field operating position of FIG. 3;

FIG. 5, is a fragmentary vertical cross-sectional view through the box when the latter is in its field operating position;

FIG. 6 is an enlarged, fragmentary cross-sectional view of the spout operating mechanism taken substantially along line 6—6 of FIG. 3;

FIG. 7 is an enlarged, fragmentary cross-sectional view through a portion of the linkage utilized to project up to the top of the box and taken substantially along line 7—7 of FIG. 3; and FIG. 8 is an enlarged, fragmentary elevational view of motion transmitting mechanism between the two opposite sections of the top, parts being broken away and shown in cross-section to reveal details of construction.

DETAILED DESCRIPTION

FIG. 1 illustrates a typical example of how the construction of the present invention may be incorporated into a harvester, the particular arrangement illustrated being a self-propelled harvester having a harvesting header 10 carried on the front portion 12 of the harvester, a chopper box 14 situated rearwardly of the header 10 for receiving crop materials therefrom and for reducing the crop stalks into small segments, a blower having a rearwardly directed discharge spout 16 for propelling the crop segments rearwardly, and, a container box 18 for receiving materials from the spout 16 and mounted upon a mobile, rear frame portion 20 of the harvester. The frame 20 includes an upper, horizontally disposed open box frame 22 located above the rear ground wheels 24 of the harvester, the box frame 22 having its lateral extremities substantially coinciding with the lateral extremities of the wheels 24.

The box 18 includes a top 28, a bottom 30, and four sides 32, 34, 36 and 38 extending between the top 28 and the bottom 30. The front side 32 is provided with an irregularly shaped entry opening 40 defined between the top 28 and an upper extremity 41 of front 32 when top 28 is projected up for the purpose of admitting crop materials from the blower spout 16 into the box 18.

The side 34 of the box 18 has an exit opening 42 located adjacent its lower extremity which extends substantially the full width of the side 34 to provide for crop discharge. A generally transversely U-shaped unloading spout 44 is open at its two opposite ends and is pivoted at its inner end by hinges 46 to the box 18 below and on opposite sides of the exit opening 42. Front and rear side panels 48 and 50 respectively of the spout 44 are positioned to overlap the corresponding front side 32 and rear side 36 of the box 18 when the spout 44 is in a folded up or raised position as shown in FIG. 2, at which time the spout 44 completely covers the exit opening 42 so as to effectively form a portion of that side of the box 18 corresponding to side 34. A hydraulic piston and cylinder assembly 52 (FIGS. 3 and 6) is connected between the box 18 and a crank 54 on the spout 44 for swinging the latter about the hinges 46 between raised and lowered positions.

When the spout 44 is lowered, the floor 56 thereof becomes aligned with and serves as an extension of the floor 58 associated with the bottom 30 of box 18. An unloading conveyor 60 extends along the two floors 56, 58 and comprises two independently operable, side-by-side chain and slat assemblies broadly denoted by the numerals 62 and 64 respectively. Each of the assemblies 62, 64 has a transverse drive shaft 66 at its outer end carrying sprockets 68 at opposite ends thereof and a driven shaft 70 at the inner end thereof adjacent the intersection of the side 38 of box 18 and the bottom 30. Driven shaft 70 has sprockets 72 at its opposite ends, and a pair of endless chains 74 and 76 are looped around respective sets of the sprockets 68, 72. A series of slats 78 span each pair of chains 74, 76 and ride along the floors 56 and 58 upon activation of the drive shaft 66 of the assembly 62 or 64. The drive shafts 66 of the two assemblies 62, 64 are not interconnected, nor are the driven shafts 70. Each of such drive shafts 66 is powered by its own selectively operable hydraulic motor 80 (mounted on the panels 48 and 50 respectively) which are operably coupled with shafts 66 via chain and sprocket drives 82. Rotation of the shafts 66 when in operation is in a counterclockwise direction viewing FIG. 5 such that the slats 78 progress outwardly toward the outer end of the spout 44.

The box 18 is mounted on the upper box frame 22 of rear frame portion 20 by a four bar linkage means 84 that enables the box 18 to be alternatively positionable in either a squared up, over-the-road, transport position as illustrated in FIG. 2 or a laterally tilted, upwardly inclined position as shown in FIG. 3 to facilitate field operations, including on-the-go loading, collecting, and unloading. When the box 18 is in its position of FIG. 2, the lateral sides 34 and 38 thereof are substantially vertically aligned with the outboard extremities of the ground wheels 24 and box frame 22, whereas in FIG. 3 it will be noted that portions of the tilted box 18 project beyond such extremities of frame 22, and the overall height of the unit is increased as a result of the tilted orientation thereof. However, even though the box 18 is oriented in its tilted position in FIG. 3, the center of gravity thereof stays substantially midway between the lateral extremities of box frame 22 to thereby maintain stability of the vehicle during field operations in the titled condition. This is achieved by virtue of the nature of the linkage 84 which enables the box 18 to effect a generally rotative type movement or motion during its change in attitude from the squared up position to the tilted position thereof, such motion being generally about an axis located inboard of the opposite lateral extremities of the box 18 and between the top 28 and bottom 30 thereof.

The linkage means 84 is a skewed arrangement in order to produce the desired rotational reorientation without substantial shifting of the center of gravity. To this end, the linkage means 84 includes a pair of links 86 and 88 on each of the front and back of the vehicle, each link 86 being pivoted at point 90 at one of its ends to the adjacent end of the box frame 22 and being pivoted at point 92 adjacent its opposite end to the box 18 adjacent the bottom 30 thereof and at a location spaced inboard from the side 34 thereof. On the other hand, each link 88 is shorter than its partner link 86, is pivoted at point 94 to the box frame 22 adjacent the opposite lateral end thereof, and, at its opposite end is pivoted at point 96 to the box 18 at a location spaced above the bottom 30 on the front side 32. Thus, it will be seen that when the box 18 is in its squared up position shown in FIG. 2, the point 96 is spaced considerably above the point 92. A hydraulic piston and cylinder unit 98 is connected between the link 86 on the one hand and a rigid mounting on the front side 32 of box 18 on the other hand, there being one piston and cylinder unit 98 for each of the front and rear sides 32 and 36 respectively of the box 18.

The top 28 is comprised of two main sections 100 and 102 swingably connected to respective sidewalls 34 and 38 by hinges 104 and 106 respectively. Section 100 includes a generally rectangular uppermost panel 108 which spans the front and rear sides 32 and 36 and extends transversely from the hinge 104 to slightly past the center of the box 18. A polygonal rear panel 110 depends from the top panel 108 slightly inboard of the rear side 36 for closing off the rear space defined between the upper extremity of the rear side 36 and the top panel 108 when the top 28 is projected up as illustrated in FIGS. 2, 3, and 5, for example. The other top section 102 has a top panel 112 of rectangular configuration corresponding in dimension to the top panel 108 but extending from the opposite hinge 106 inwardly to a point slightly past the center of the box 18 such that the sections 100 and 102 mutually overlap with the section 102 on the outside. A polygonal rear panel 114 depends from the top panel 112 just inboard of the rear side 36 for the purpose of substantially closing off the space defined between the upper extremity of rear side 36 and top panel 112 when the top 28 is projected up in its field-operating position. A corresponding front panel 116 depends from the top panel 112 a short distance inboard of the front side 32 and serves as one lateral boundary of the entry opening 40.

As illustrated in FIG. 2, the top sections 100 and 102 mutually overlap and lie flatly against one another when the box 18 is in its over-the-road position, thus presenting a generally flat, horizontal uppermost extremity for the box 18 at such time. On the other hand, when the top 18 is projected upwardly to its field-operating position as shown in FIGS. 3 and 5, the top sections 100 and 102 converge together at their free ends to present a peak 118 of the box 18. A pair of motion transmitting links 120 and 122 on opposite fore and aft ends of the box 18 pivotally interconnect the sections 100 and 102 in such a manner that movement of one of the top sections 100 is transmitted to the other section 102 such that both sections rise and fall simultaneously when operated.

In order to effect such operation of the top 28, a pair of push rod links 124 and 126 are coupled between the spout 48 on opposite panels 48 and 50 thereof and the top section 100 on opposite fore and aft sides thereof. Each link 124, 126 has a pivotal connection 128 at its lower end with the spout 44 and is slidably received within a sleeve 130 (FIG. 7) at its upper end, there being a first shoulder 132 on the link 124 disposed for abutting engagement with one end of the sleeve 130 and a second shoulder 134 spaced from the shoulder 132 a distance which is in excess of the length of sleeve 130, such second shoulder 134 being disposed for abutting engagement with the opposite end of the sleeve 130 under appropriate circumstances. A collar 136 is rigidly affixed to the sleeve 130 at right angles therewith to rotatably receive a pintle 138 projecting outwardly from the proximal edge extremity of the top section 100 in order that the link 124 or 126 is pivotally connected to the top section 100 through the slight lost motion connection afforded by the sleeve 130 and the spaced apart shoulders 132, 134.

OPERATION

FIG. 2 shows the box 18 situated in its over-the-road, compacted condition with the top 28 flat, the sides 32-38 essentially vertical, the bottom 30 essentially horizontal, and the spout 44 pulled up into its stowed, space-conserving position. If desired, the dimensions of the box 18 when in this condition may essentially correspond to the maximum height, width and length dimensions permitted by the relevant governmental authorities with respect to vehicles which travel on public thoroughfares. Such rectangular configuration of the box 18 thus permits the same to effectively maximize its utilization of the space made available by such roading restrictions.

If it is then desired to place the box 18 in condition for field operations, the hydraulic piston and cylinder assemblies 98 are extended whereby to cause the box 18 to rotate into a tilted attitude as illustrated in FIGS. 3 and 5 until such time as the side 38 projects upwardly at approximately sixty degrees while the bottom 30 projects upwardly and outwardly in the opposite direction at approximately thirty degrees. Actuating the hydraulic cylinder 52 to then swing the spout 44 down into its unloading position as shown in FIG. 3 and in FIG. 5 causes the push links 124 and 126 to be displaced axially upwardly such that the shoulders 132 thereof come to bear against the lower ends of the sleeves 130, forcing the top section 100 to swing upwardly about hinge 104 until its position of FIG. 3 and FIG. 5 is reached. As a result of the motion transmitting links 120 and 122, such upward movement of the top section 100 is transmitted to the other top section 102 whereby both sections 100 and 102 of the top 28 are projected up simultaneously until the peak 118 is presented. Such upward projection of the top 28 also causes the entry opening 40 to be presented whereby crop materials may be introduced into the box 18 by the lower spout 16. Manifestly, with the top 28 projected up, the holding capacity of the box 18 is significantly increased beyond that available when the box 18 is in its roading position of FIG. 2.

In the event that the truck or trailer is alongside the box 18 at the time harvesting is commenced and the box 18 is tilted, little or no accumulation need take place within the box 18 inasmuch as incoming materials may be immediately unloaded via the conveyor 60 of spout 44. Once the truck or trailer becomes filled, however, the hydraulic motors 80 may then be deactivated so as to correspondingly halt operation of the conveyor 60. Crop materials then accumulate within the container 18, at which time the additional capacity provided by the raised up top 28 can be particularly beneficial. Once a truck or trailer again becomes available, operation of the conveyor 60 may be resumed to unload the contents of the box 18. Ideally, the entire operation is carried out on-the-go for maximum efficiency. Returning the box 18 to its over-the-road travel condition is a simple reversal of the above-described procedure.

It is significant to note that the shape of the box 18 is particularly conducive to complete filling when the top 28 is up and box 18 is rotated to its fullest tipped position of FIGS. 3 and 5. In this respect it will be seen that both the top panel 112 and the side 34 project downwardly from a horizontal plane at approximately sixty degree angles at such time, which approximately corresponds to the angle of recline of forage materials. Thus, when the materials begin to accumulate in a pile within the box 18, the opposite sides of the pile naturally tend to match up with and lie against the inclined side 34 and the inclined top panel 112, thereby maximizing available space.

We claim:

1. A vehicle for use in transporting harvested crops comprising:
    a mobile frame;
    a crop receiving container carried by said frame and shiftable between an over-the-road travel condition in which the container is compacted to its minimum height and width dimensions and a field working condition for loading, collecting, and unloading harvested crops in which the container exceeds said minimum height and width dimensions,
    said container including a top wall portion thereof which is shiftable into a high capacity position to expand the volume of said container when the latter is in said field working condition; and
    means for unloading crops from the container while the latter is in said field-working condition,
    said unloading means including a discharge spout shiftable relative to said top wall portion between a standby position and an operating position, said top wall portion being provided with means coupling the top wall portion with said spout and responsive to shifting of said spout into and out of its operating position for effecting said shifting of the top wall portion into and out of its high volume position.

2. A vehicle for use in transporting harvested crops as claimed in claim 1 wherein said top wall portion includes a pair of sections hinged to opposite sides of the container and disposed in partially overlapping relationship for intersecting one another at a peak of the container when said top wall portion is in its high capacity position and for lying generally flatly against one another when the container is in its compacted condition.

3. A vehicle for use in transporting harvested crops as claimed in claim 2, wherein said means for effecting shifting of the top wall portion includes linkage operably connecting the spout with said top sections for swinging said sections about their respective hinges during said shifting of the spout.

4. A vehicle for use in transporting harvested crops as claimed in claim 2, wherein said container is mounted for movement in a manner to dispose the bottom thereof generally horizontal when the container is in said over-the-road condition and generally upwardly and outwardly inclined when the container is in said field-working position.

5. A vehicle for use in transporting harvested crops as claimed in claim 4, wherein one of said sections and an opposing side of the container are inclined downwardly from a horizontal plane at respective approximately sixty degree angles when the top of the container is in its high capacity position and the container is moved to a position disposing the bottom thereof upwardly and outwardly inclined.

6. A vehicle for use in transporting harvested crops as claimed in claim 1, wherein said container is mounted for movement in a manner to dispose the bottom thereof generally horizontal when the container is in said over-the-road condition and generally upwardly and outwardly inclined when the container is in said field-working position.

* * * * *